United States Patent [19]

Staggs

[11] Patent Number: 4,966,055
[45] Date of Patent: Oct. 30, 1990

[54] CHAIN SAW SHARPENING DEVICE

[75] Inventor: R. William Staggs, Orono, Minn.

[73] Assignee: Northern Precision Twin Cities Inc., Long Lake, Minn.

[21] Appl. No.: 403,740

[22] Filed: Sep. 6, 1989

[51] Int. Cl.⁵ ............................................. B23D 63/16
[52] U.S. Cl. ........................................ 76/80.5; 76/37; 51/209 R; 51/295
[58] Field of Search ................ 76/25 A, 37, DIG. 11, 76/DIG. 12, 115; 51/293, 295, 204, 209 R

[56] References Cited

U.S. PATENT DOCUMENTS

| | | | |
|---|---|---|---|
| 2,436,873 | 3/1948 | Sneva . | |
| 2,986,048 | 5/1961 | Nielsen | 76/37 |
| 3,013,448 | 12/1961 | Deck | 76/25 A |
| 3,020,783 | 2/1962 | Hill | 76/31 |
| 3,088,248 | 5/1963 | Strzoda . | |
| 3,664,819 | 5/1972 | Sioui et al. | 51/295 |
| 3,738,201 | 6/1973 | Allison . | |
| 3,779,727 | 12/1973 | Sioui et al. | 51/295 |
| 3,984,214 | 10/1976 | Pratt et al. | 51/295 |
| 4,505,251 | 3/1985 | Stoll . | |
| 4,533,812 | 8/1985 | Lorenz | 76/DIG. 12 |
| 4,611,438 | 9/1986 | Siden . | |
| 4,732,056 | 3/1988 | Foster . | |
| 4,836,058 | 6/1989 | Shepherd . | |
| 4,908,046 | 3/1990 | Wiand | 51/295 |

Primary Examiner—Roscoe V. Parker
Attorney, Agent, or Firm—Merchant, Gould, Smith, Edell, Welter & Schmidt

[57] ABSTRACT

A device for sharpening chain saw cutter teeth includes a rigid disc member which has an abrasive coating deposited on its outer circumferential edge. The abrasive coating has a circumferential outer grinding surface which, when viewed in cross-section on a plane which is perpendicular to and radial to the disc member, has a curvature which is adapted to conform to the curvature of a concave surface in a common type of chain saw cutter tooth. The device can be mounted to a common rotary tool such as a bench grinder or a portable grinder to manually sharpen a chain saw in an inexpensive and efficient manner.

9 Claims, 1 Drawing Sheet

CHAIN SAW SHARPENING DEVICE

BACKGROUND OF THE INVENTION

1. Field of the Invention

This invention relates generally to devices which are used to sharpen a cutting surface. More specifically, the invention relates to a device for sharpening cutting edges on chain saw cutter teeth which have a concave surface next to at least one of their cutting edges.

2. Description of the Prior Art

Chain saws, of course, have long been common use for cutting timber and other material, both in the United States and throughout the world. As with any cutting instrument, the cutting edges on the individual cutter links which make up a saw chain grow dull after time. Rather than discard a dull chain and replace it with a new one, it is generally more economical to re-sharpen the chain. However, due to the irregular shape of the cutting edges on many of the different types of chain saw teeth and the difficulty of holding the tooth during sharpening, resharpening in the past has often been time consuming and frustrating.

Various machines have been proposed for sharpening the cutter link edges on a saw chain. An example of such a machine is disclosed in U.S. Pat. No. 4,732,056 to Foster. In this device, a saw chain is guided by a pair of guide wheels past a rotatable abrasive wheel, which engages and sharpens the cutting edges. The abrasive wheel in Foster is beveled so as to provide a better engagement angle with the cutting edges of the various lengths.

One disadvantage of sharpening machines such as that disclosed in the Foster patent is that they are relatively complicated and expensive, which effectively precludes their use by all persons or entities who do not have a large volume of dull chains to sharpen. Moreover, certain types of chain saws have one or more curved cutting edges which cannot be sharpened by advancing the individual links linearly with respect to an abrasive surface, which is the process used in many prior art sharpening machines. A further disadvantage of many of the prior art sharpening machines is that they require removal of the chain from the saw prior to sharpening.

It is clear that there has existed a long and unfilled need in the prior art for a chain saw sharpening device which is simple and inexpensive, which is efficient at sharpening cutter links having one or more curved cutting edges and which is capable, if desired, of sharpening a chain saw link cutting edge while the chain is still positioned on a saw.

SUMMARY OF THE INVENTION

Accordingly, it is an object of this invention to provide a chain saw sharpening device which is simple and inexpensive to produce, relative to existing types of sharpening machines.

It is further an object of this invention to provide a chain saw sharpening device which is highly efficient at sharpening curved chain saw tooth cutting edges.

It is a third object of this invention to provide a chain saw sharpening device which is capable, if desired, of sharpening the edges on a chain saw cutting link while the chain is still positioned on the saw.

In order to effect these and other objects of the invention, an apparatus according to the invention for sharpening chain saw cutter teeth includes a rigid disc member having an outer circumferential edge, the disc member having a central hole defined therein which adapts the disc member for mounting to a rotary tool; and an abrasive coating on at least the outer circumferential edge of the disc member; the abrasive coating having a circumferential outer grinding surface, which, when viewed in cross section along a plane which is perpendicular to and radial to the disc member, has a curvature which is adapted to conform to a concave surface in the chain saw cutter teeth.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
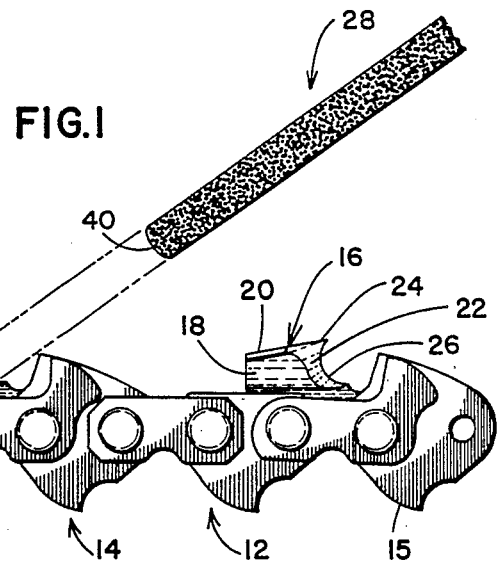
FIG. 1 is an elevational view of a particular type of saw chain and of a sharpening tool constructed according to a preferred embodiment of this invention, which depicts the orientation of engagement of the sharpening tool with respect to the saw chain.

Referring now to the drawings, wherein like reference numerals designate corresponding structure throughout the views, and referring in particular to FIG. 1, a particular type of saw chain 10 which is in common use throughout the art today includes a repeating series of cutter lengths 12 and connecting links 14. Both the cutter lengths 12 and the connecting lengths 14 have an underlying pawl 15 which is configured to be engaged with the sprockets in a chain saw drive mechanism. Each of the cutter lengths 12 is further provided with a cutter tooth 16 on an upper portion thereof, as is shown in FIG. 1. Each of the cutter teeth 16 includes a vertically upstanding side plate 18 and a substantially horizontal top plate 20 which is unitary with an uppermost portion of the side plate 18 and is configured so as to form an L-shaped cross section therewith. When the cutter tooth 16 is properly sharpened, a concave ground surface 22 is defined therein obliquely with respect to both side plate 18 and top plate 20. Ground surface 22 thus defines a sharp upper cutting edge 24 on the edge of top plate 20 which is contiguous with ground surface 22, and a side cutting edge 26 on the portion of side plate 18 which is contiguous with the ground surface 22.

Figure 4:
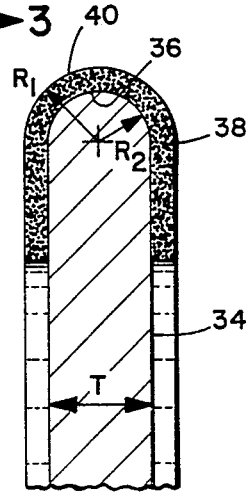
FIG. 4 is a fragmentary isolational view which depicts the uppermost portion of FIG. 3 in greater detail for representative purposes.

Referring now to all of the figures, a chain saw tooth sharpening tool 28 constructed according to a preferred embodiment of the invention includes a circular steel disc member 30 which has a central hole 32 defined therein for adapting the disc member 30 for mounting to a rotary tool such as a bench grinder, a portable grinder or a conventional chain saw grinding machine. Steel disc 30 includes a pair of side surfaces 34 and a circumferential edge 36 which is configured to a constant radius $R_1$, as is best shown in FIG. 4. As is shown in FIG. 4, disc 30 is formed to a thickness T. The radiused circumferential edge 36, the side surfaces 34 and the surface which defines central hole 32 together form the entire outside surface of steel disc 30.

Figure 2:
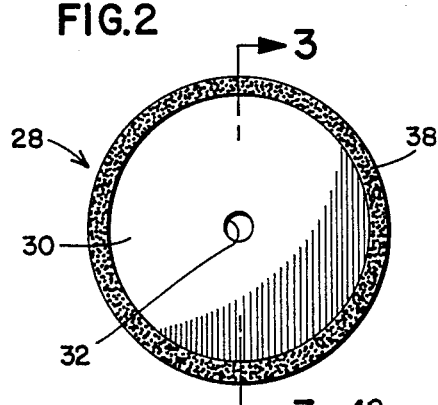
FIG. 2 is a side elevational view of the sharpening tool which is pictured in FIG. 1.
Figure 3:
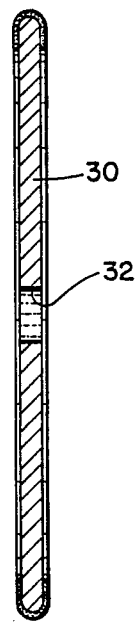
FIG. 3 is a cross-sectional view taken along lines 3—3 in FIG. 2.

Referring now to FIGS. 2-4, an abrasive coating 38 is formed as a layer of constant thickness about the outer periphery of steel disc 30. Thus, abrasive coating 38 is deposited on a radially outward portion of each of the side surfaces 34 and completely covers the radiused circumferential edge 36 of the steel disc 30. The coating 38 could comprise any abrasive material which is capable of sharpening a hardened steel cutter tooth, but is preferably formed of Cubic Boron Nitride (CBN), which is obtainable under the trademark Borazon from the General Electric Company, Specialty Materials Department, in Worthington, Ohio. Preferably, the abrasive coating 38 is electro-deposited onto the peripheral portion of steel disc 30 through a process which is known to those skilled in the art. This ensures that the abrasive coating 38 will be of substantially constant thickness about the radiused circumferential edge 36 of the steel disc 30. This creates a circumferential grinding surface 40 which, when viewed in cross-section along a plane which is perpendicular to and radial to disc 30, has a curvature $R_2$ which is radially constant and is adapted to conform to the curvature of the ground surface 22 in the cutter tooth 16 of the saw chain 10 which is to be sharpened.

Table I, which is provided below, lists the optimum dimensions of disc thickness (T), the radius of the circumferential edge 36 ($R_1$) and the radius of the circumferential grinding surface 40 ($R_2$) with reference to four categories I, II, III, IV of chains having a configuration of the type which is shown in FIG. 1. Category I includes chains which have a pitch of ¼", 0.325", and ⅜"LP. (The abbreviation LP stands for low profile, which is a term of common use in the art) Category II includes chains which have a pitch of ⅜" or ⅜"LP. Category III has been found effective at sharpening cutter teeth in chain saws which have a pitch of ⅜" or 0.404". Category IV has been effective in sharpening cutter teeth in a chain having a pitch of ½".

TABLE I

|  | Category of Chains | | | |
|---|---|---|---|---|
|  | I | II | III | IV |
| Thickness (T)inches | 0.125 ⅛ | 0.15625 (5/32) | 0.18750 (3/16) | 0.25 ¼ |
| R1(inches) | 0.0625 (1/16) | 0.07813 (5/64) | 0.09375 (3/32) | 0.125 ⅛ |
| R2(inches) | 0.0725 ±0.002 | 0.08813 ±0.002 | 0.10375 ±0.002 | 0.135 ±0.002 |

In order to sharpen a saw chain 10 with a tool 28 constructed according to the invention, the saw chain 10 may be left on the chain saw or may be removed and placed in a suitable work folder as desired. The sharpening tool 28 is then mounted to a rotary tool and is advanced relative to each of the cutter teeth 16 in sequence until the circumferential grinding surface 40 comes in contact with the concave ground surface 22 in the cutter tooth 16. The circumferential grinding surface 40 is then manually manipulated with respect to the cutter teeth 16 until a smooth cutting edge is honed onto the upper cutting edge 24 and the side cutting edge 26 in the cutter tooth 16. Once all of the cutter teeth 16 have been sharpened in this manner, the saw chain 10 may then be remounted onto the chain saw and used until it becomes dull again.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An apparatus for sharpening chain saw cutter teeth of the type which have a concave surface next to at least one cutting edge thereof, comprising:
    a rigid metallic disc member having an outer circumferential edge, said disc member further having a central hole defined therein which adapts said disc member for mounting to a rotary tool; and
    an abrasive coating on at least said outer circumferential edge of said disc member; said abrasive coating having a circumferential outer grinding surface which, when viewed in cross-section along a plane which is perpendicular to and radial to said disc member, has a curvature which is adapted to conform to the curvature of the concave surface in the chain saw cutter teeth, said outer circumferential edge of said disc member being, when viewed in cross-section along a plane which is perpendicular to and radial to said disc member, curved in the same shape as said grinding surface, whereby said abrasive coating may be formed to a constant thickness.

2. An apparatus according to claim 1, wherein said curvature of said grinding surface is of constant radius.

3. An apparatus according to claim 1, wherein said curvature of said grinding surface is of constant radius.

4. An apparatus according to claim 1, wherein said abrasive coating comprises Cubic Boron Nitride.

5. An apparatus according to claim 3, wherein said constant radius is approximately 0.0725 inches.

6. An apparatus according to claim 3, wherein said constant radius is approximately 0.08813 inches.

7. An apparatus according to claim 3, wherein said constant radius is approximately 0.10375 inches.

8. An apparatus according to claim 3, wherein said constant radius is approximately 0.135 inches.

9. An apparatus according to claim 1, wherein said abrasive coating is formed onto said disc member through an electro-depositing process.

* * * * *

UNITED STATES PATENT AND TRADEMARK OFFICE
CERTIFICATE OF CORRECTION

PATENT NO. : 4,966,055

DATED : October 30, 1990

INVENTOR(S) : R. William Staggs

It is certified that error appears in the above-identified patent and that said Letters Patent is hereby corrected as shown below:

Column 3, line 12, delete "radiallY" and insert therefor --radially--

Claim 2 and 3 are identical - one should be deleted and the rest renumbered.

Signed and Sealed this

Twenty-fifth Day of August, 1992

Attest:

DOUGLAS B. COMER

*Attesting Officer*  *Acting Commissioner of Patents and Trademarks*